INVENTOR.
Friedrich Vogelmann,
BY Hume, Clement, Hume & Lee
Attorneys.

United States Patent Office 3,517,426
Patented June 30, 1970

3,517,426
ROLLER FOR HANDLING HEAVY HOT MATERIALS
Friedrich Vogelmann, 716 S. La Grange Road,
La Grange, Ill. 60525
Filed Aug. 7, 1967, Ser. No. 658,723
Int. Cl. B65g 39/02
U.S. Cl. 29—125                                                                                   4 Claims

ABSTRACT OF THE DISCLOSURE

A roller for handling heavy hot materials which comprises a shaft having fixedly mounted thereon two end support plates and a central support and mounting plate. On each side of the central support and mounting plate in the preferred embodiment there is fixedly attached to the shaft auxiliary support plates. Two exterior tubular members each have one end welded to the center support and mounting plate and the other end extending freely over but in a press-fit, sliding relationship with an end support plate. In this manner the roller is supported at its central portion and the tubular members are permitted to expand at their free ends so that the roller will withstand the contact with the hot heavy materials it is handling.

---

Figure 1:
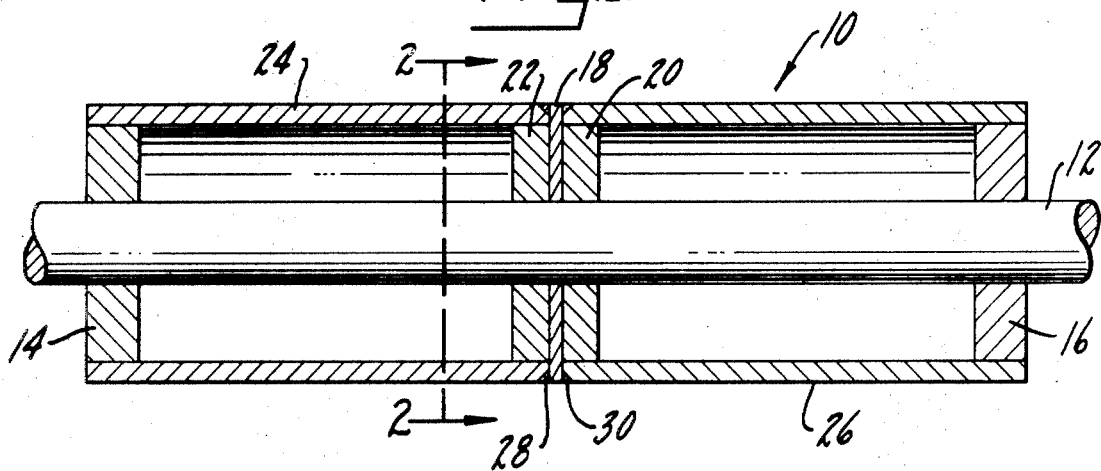

The present invention relates to a roller for handling heavy hot materials and, more particularly, to a roller for handling heavy hot metal billets.

Conveyors handling heavy hot metal billets utilize conventional rollers including a shaft, two end support plates and a single exterior tubular member. The end support plates are suitably secured to the shaft in spaced relationship and one end of the tubular member is welded to one end support plate while the other end of the tubular member loosely fits over the other end support plate to permit expansion of the tubular member caused by the high temperature of the metal billets. It has been found, however, that such rollers are prematurely damaged in use because the weld attaching the tubular member to the end support plate breaks. Such necessitates repair and replacement of the roller, which is an expensive and time-consuming procedure, particularly since it necessitates shutting down the production line until the repair or replacement has been effected.

It is theorized that these conventional rollers break at the weld between the end support plate and the tubular member for the following reason.

The tremendous weight of the metal billets causes the tubular member to bend at the center and forces the end support plate to bite into the free end of the tubular member to cause a non-sliding relationship therewith rather than the desired sliding relationship. Accordingly, when the tubular member attempts to expand, by virtue of the heat it receives from the metal billet, such expansion is resisted by this end support plate. The forces exerted by the tubular member trying to expand become large enough to require something to give in the roller. As the weld at the other end between the end support plate and the tubular member is generally the weakest point in the roller structure this weld breaks.

It is, therefore, an object of this invention to provide an improved roller for handling heavy hot materials.

It is another object to provide a roller for handling heavy hot metal billets.

It is a further object to provide a roller which will withstand the weight and high temperatures of hot metal billets being transported thereon.

These and other objects more apparent hereinafter are accomplished by the roller of the present invention which comprises a shaft having fixedly attached thereto two end support plates and a center support and mounting plate, and two exterior tubular members each of which have one end welded to the center support and mounting plate, and the other end press-fitted over an end support plate. In the preferred embodiment of the present invention auxiliary support plates are attached by suitable means to the shaft of the roller on each side of the center support and mounting plate to provide additional support for the two exterior tubular members.

Figure 2:
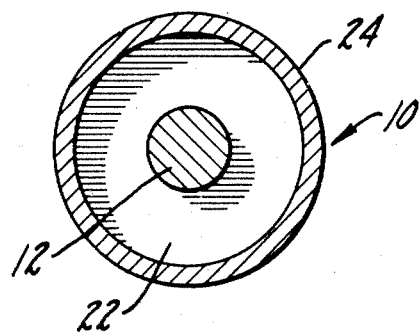

The invention, both as to its organization and method of operation, taken with further objects and advantages thereof will be understood by reference to the following description taken in conjunction with the accompanying drawings in which:

FIG. 1 is a partially cross-sectional view of a roller embodying the features of the present invention; and
FIG. 2 is a cross-sectional view of the roller of FIG. 1 taken along line 2—2 of FIG. 1.

Referring now to the drawings and, more particularly to FIGS. 1 and 2, there is illustrated a roller embodying the features of the present invention and indicated generally by reference number 10. The roller 10 includes a shaft 12 which, as will be understood by one with ordinary skill in the art, is mounted by suitable bearing means (not shown) in the conveyor which handles, for example, the heavy hot metal billets used in metal fabrication plants for conveying these metal billets to and from heating and forming operations. The shaft 12 may have conventional gearing means or the like (not shown) for positively driving the roller 10, or it may be mounted for free rotation where, for example, the materials being handled by the conveyor are propelled by gravity.

Fixedly attached by conventional means to the shaft 12 are two end support plates 14 and 16. Approximately midway between the end support plates 14 and 16 is a center support and mounting plate 18 attached by welding or the like to the shaft 12. In accordance with the preferred embodiment of the present invention on each side of the center support and mounting plate 18 are auxiliary support plates 20 and 22 which are fixedly attached to the shaft 12 by welding or other suitable means (not shown). Two exterior tubular members 24 and 26 each have one end abutting a side of the center support and mounting plate 18 and welded at points 28 and 30, respectively, to the center support and mounting plate 18. The other end of each of the tubular members 24 and 26 extends over and is in a press-fit, sliding relationship with the end support plates 14 and 16, respectively.

In this manner the roller 10 is supported at its center by the center support and mounting plate 18, which support is supplemented by the support plates 22 and 20 particularly below the welds 28 and 30. The manner in which the roller 10 is constructed at its center portion prevents damage to the welds 28 and 30 which attach the tubular members 24 and 26, respectively, to the center support and mounting plate 18. Furthermore, the end support plates 14 and 16 provide support for the free ends of the tubular members 24 and 26, respectively, while permitting the ends of these tubular members to expand when heated by the hot metal billets being handled by the conveyor.

All of the parts of the roller 10 may be made of steel or other conventional metal material, or the like, the selection of the material being within the ordinary skill of one in the art and not forming any part of the present invention.

Though the present invention has been described in particularity with respect to its use for handling hot metal billets, it will be understood by one with ordinary skill in the art that the roller of the present invention has application for the use in handling any heavy hot material.

What is claimed is:

1. A roller for handling heavy hot materials comprising a shaft, two end support plates fixedly attached in spaced relationship to said shaft, a center support and mounting plate fixedly attached to said shaft between said end support plates, two exterior tubular members each having one end abutting a side of said center support and mounting plate and welded to said center support and mounting plate and the other end extending over and in a press-fit sliding relationship to one of said end support plates.

2. A roller for handling heavy hot materials comprising a shaft, two end support plates fixedly attached in spaced relationship to said shaft, a center support and mounting plate fixedly attached to said shaft between said end support plates, two exterior tubular members each having one end welded to said center support and mounting plate and the other end extending over and in a press-fit, sliding relationship to one of said end support plates, and two auxiliary support plates mounted on each side of said center support and mounting plate and fixedly attached to said shaft, said auxiliary support plates providing support for the ends of the tube welded to the center support and mounting plate.

3. The roller of claim 1 wherein said center support and mounting plate is approximately midway between said end support plates.

4. A roller for handling heavy hot metal billets comprising a shaft, two end support plates fixedly attached in spaced relationship to said shaft, a center support and mounting plate fixedly attached to said shaft approximately midway between said end support plates, two auxiliary support plates mounted on each side of said center support and mounting plate, each of said auxiliary support plates being fixedly attached to said shaft, and two exterior tubular members each having one end welded to said center support and mounting plate and the other end extending over and in a press-fit, sliding relationship to one of said end support plates, said auxiliary support plates providing support for the end of said tubular members welded to said center support and mounting plate.

References Cited

UNITED STATES PATENTS 3,001,682  9/1961  Carroll et al. _____ 29—125
3,115,335  12/1963  Ormitz et al. _____ 263—6

WALTER A. SCHEEL, Primary Examiner

L. G. MACHLIN, Assistant Examiner

U.S. Cl. X.R.

29—125